United States Patent
Humburg et al.

(10) Patent No.: US 6,695,037 B1
(45) Date of Patent: Feb. 24, 2004

(54) HEATING DEVICE FOR AN AUTOMOBILE ESPECIALLY A WATER HEATING DEVICE IN THE FORM OF A BACKUP HEATER OR AUXILIARY HEATER

(75) Inventors: Michael Humburg, Göppingen (DE); Hermann Eppler, Balingen (DE); Paul Achatz, Esslingen (DE)

(73) Assignee: J. Eberspächer GmbH & Co., Esslingen (DE)

( * ) Notice: Subject to any disclaimer, the term of this patent is extended or adjusted under 35 U.S.C. 154(b) by 0 days.

(21) Appl. No.: 09/830,247
(22) PCT Filed: Oct. 7, 1999
(86) PCT No.: PCT/EP99/07515
§ 371 (c)(1), (2), (4) Date: Jun. 19, 2001
(87) PCT Pub. No.: WO00/24600
PCT Pub. Date: May 4, 2000

(30) Foreign Application Priority Data

Oct. 24, 1998 (DE) .......................... 198 49 103

(51) Int. Cl.⁷ ................................. F28D 1/06
(52) U.S. Cl. ............................ 165/51; 165/73; 165/75; 237/36
(58) Field of Search ................... 165/56, 57, 51, 165/72, 73, 74, 75; 122/2; 237/12.3 R, 28, 32, 36; 220/567.3; 150/157

(56) References Cited

U.S. PATENT DOCUMENTS

| 1,826,169 A | * | 10/1931 | Douglas, Jr. | ........... 237/12.3 R |
| 1,936,472 A | * | 11/1933 | Weese | ........................... 165/51 |
| 2,458,826 A | * | 1/1949 | Blumberg et al. | ............. 165/51 |
| 3,640,457 A | * | 2/1972 | Collinet et al. | ......... 237/12.3 B |
| 3,951,124 A | * | 4/1976 | Fairbanks et al. | ............. 165/51 |
| 4,234,040 A | * | 11/1980 | Argyle et al. | .................. 165/51 |
| 5,099,909 A | * | 3/1992 | Barigelli | ....................... 165/51 |
| 6,024,291 A | * | 2/2000 | Locke | ................... 237/12.3 R |

FOREIGN PATENT DOCUMENTS

| DE | 33 40 664 A1 | 5/1985 |
| DE | 295 17 365 U1 | 4/1997 |
| DE | 195 46 882 A1 | 6/1997 |
| GB | 2 149 469 A | 6/1985 |
| GB | 2 306 561 A | 5/1997 |

OTHER PUBLICATIONS

Michael Humburg, Feb. 3, 2000, *Hydronic—eine Heizgeratefamilie in Modultechnik*ATZ/MTZ Sondergsabe.

Michael Humburg, Feb. 3, 2000, *Der neue Zuheizer von Eberspaecher*ATZ Automoblitechnische Zeitschrift 97 (1995) 12.

* cited by examiner

*Primary Examiner*—Terrell McKinnon
(74) *Attorney, Agent, or Firm*—McGlew and Tuttle, P.C.

(57) ABSTRACT

A heater of a motor vehicle is provided which is operated with liquid fuel. The heater is especially a water heater in the form of an auxiliary heater or parking heater. The heater has a burner and heat exchanger in a housing with a cover, in which the connecting branches for the water feed and air feed and for the water return and the air return are arranged. At least one of the connecting branches is designed as a rotatable elbow branch (rotatable elbow socket). An antirotation lock may be provided for easy individual line guidance requiring little space in the automobile.

12 Claims, 4 Drawing Sheets

HEATING DEVICE FOR AN AUTOMOBILE ESPECIALLY A WATER HEATING DEVICE IN THE FORM OF A BACKUP HEATER OR AUXILIARY HEATER

FIELD OF THE INVENTION

The present invention pertains to a heater of a motor vehicle, which heater is operated with liquid fuel, especially a water heater in the form of an auxiliary heater or a parking heater, with a burner and heat exchanger in a housing with cover, in which the connecting branches for the water and air feed and for the water and air return are arranged.

BACKGROUND OF THE INVENTION

Prior-art above-mentioned motor vehicle water heaters have axial water connecting branches, which are rigidly fastened to the cover and are connected to an external heat exchanger or to the cooling water circuit of the motor vehicle engine via flexible tubes.

Depending on the type of the furnishing, the water heaters are either auxiliary heaters, which contribute to the improvement of the thermal output to the interior of the vehicle and the engine with the engine of the motor vehicle running, or parking heaters, which make thermal output available to the vehicle in an engine-independent manner. The flexible tubes are installed individually depending on the type of the vehicle. Sharper bends in the tubes (i.e., small radii) inherently compromise the service life and the tightness of the heater arrangement. If sharper bends in the tubes are done away with, installation space is often lost.

SUMMARY AND OBJECTS OF THE INVENTION

Based on the above-mentioned state of the art, the object of the present invention is to provide a motor vehicle heater of the type mentioned in the introduction, which makes possible an improved arrangement of the lines especially in the connection area of the heater.

According to the invention, a heater of a motor vehicle is provided which is operated with liquid fuel. The heater is especially a water heater in the form of an auxiliary heater or parking heater. The heater has a burner and heat exchanger in a housing with a cover, in which the connecting branches for the water feed and air feed and for the water return and the air return are arranged. At least one of the connecting branches is designed as a rotatable elbow branch.

The essence of the present invention is that at least one of the connecting branches is designed as a rotatable elbow branch, namely, the feed branch or the return branch. The respective other branch is now preferably designed as a straight branch as according to the state of the art.

However, both connecting branches for the feed and return may advantageously also be designed as elbow branches and arranged optionally in different rotated positions in relation to the housing cover depending on the type of the vehicle.

In particular, the rotatable elbow branch has a securing device against rotation with a lock to secure the elbow branch in a selected rotated position on the housing cover.

The rotatable elbow branch has an outer ring seal in the direction of the outside of the cover and an inner ring seal in the direction of the heat exchanger, the outer and inner ring seals being fixed by the housing cover that can be fastened to the housing. The ring seals may be, in particular, O-rings or flat packings, which may preferably be pretensioned by a spring in the axial direction.

The device for securing against rotation preferably have at least one spring or a projection with an upper locking mechanism away from the housing cover on the circumference of one leg of the elbow branch, which leg can be fastened at right angles to the housing cover, and an axial groove, which is adapted in shape and is associated with the projection, in the cover opening associated with the elbow branch, where the underside of the opening of the cover has a ring locking mechanism, which can be caused to engage the upper locking mechanism of the projection.

The elbow branch may have two projections, preferably offset by 180°, and the housing cover may correspondingly have two axial grooves, which are preferably offset by 180°.

The leg of the elbow branch, which leg can be fastened at right angles to the housing cover, has a circumferential flange, which is located at a spaced location from the projection to the outside and acts as an outer axial support of the outer ring seal.

The outer ring seal is preferably axially pretensioned by a spring in a rotary fastened position of the elbow branch on the housing cover and secures the projection in the ring locking mechanism.

With the housing cover mounted on the housing, the elbow branch fastened to the housing cover may come axially into contact with an axial stop at the heat exchanger, especially at the water tank water connection. As a result, an elbow branch, which is arranged in a selected locked position in relation to the housing cover, is prevented from being pushed farther inward against the force of the outer ring seal and from being consequently able to be dislodged from its locked position once the cover is firmly attached to the housing.

It is especially advantageous to provide two projections of different width and two axial grooves with correspondingly different widths. As a result, the elbow branch can be introduced axially into the opening of the cover in a single intended rotation angle position only and can then be rotated laterally in the locking mechanism. If the free leg of the elbow branch, which normally extends in parallel to the outside of the cover, is directly above a fastening point during the axial introduction, in which the cover can be connected and especially screwed to the housing, it is inevitably ensured that the above-mentioned fastening point will always be accessible for the secure, clearance-free fastening of the cover on the housing with the elbow branch rotated laterally in the locking mechanism, and the elbow branch will also be held securely in the rotated position after the clearance-free fastening of the cover on the housing.

Thus, the space requirement for installing heaters in a vehicle can be minimized by the present invention. The lines are arranged in a simple manner in a vehicle, and the lines can be aligned individually and reliably by a simple installation in a given type of vehicle. The molded tubes can be designed as rather uncomplicated tubes. Their service life and tightness are comparatively high, because sharp curvatures can be avoided by means of the elbow branches. Marked package advantages will also arise compared with prior-art water heaters. If desired, different branch diameters may also be provided in a simple manner.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figures 1A, 1B, 1C:
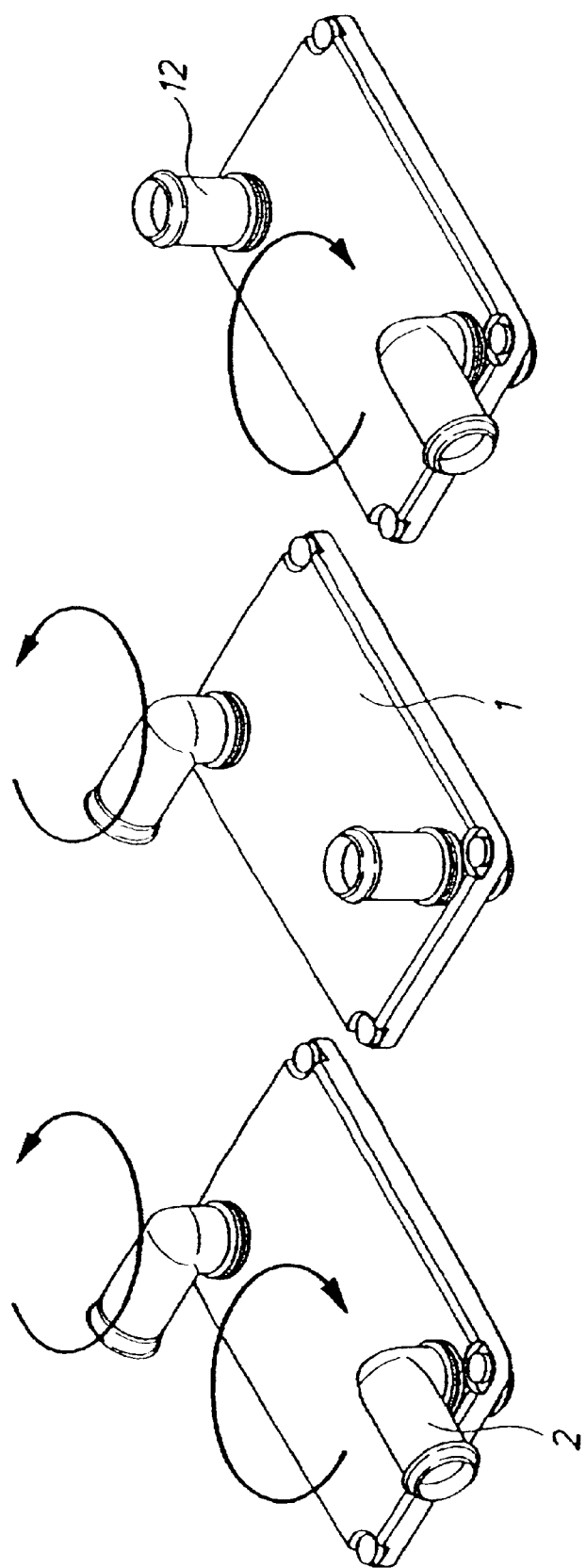
FIG. 1A is a schematic perspective view of an embodiment variant of a cover with the elbow branch fastened with an axial branch variant.
FIG. 1B is a schematic perspective view of another embodiment variant of a cover with the elbow branch fastened with an axial branch variant.
FIG. 1C is a schematic perspective view of another embodiment variant of a cover with the elbow branch fastened with an axial branch variant.

Referring to the drawings in particular, according to FIGS. 1A to 1C, three embodiment variants are shown in perspective views of a housing cover 1 of a water heater for a motor vehicle, where only the cover and the connecting branch for the water feed and water return to a cooling water circuit of the vehicle engine are shown, but the rest of the heater operated with liquid fuel is not shown.

In the embodiment variant shown in FIG. 1A (on the left), the connecting branches are two elbow branches 2 of identical design are positioned in different rotated positions with legs extending at right angles to one another. In FIG. 1B, one of the other two embodiment variants, only the feed branch is designed as an elbow branch 2 and the other branch is designed as an axial branch 12. Only the return branch is designed as an elbow branch 2 and the other branch is designed as an axial branch 12 in the embodiment of FIG. 1C (the other of the latter two embodiments).

Figure 2:
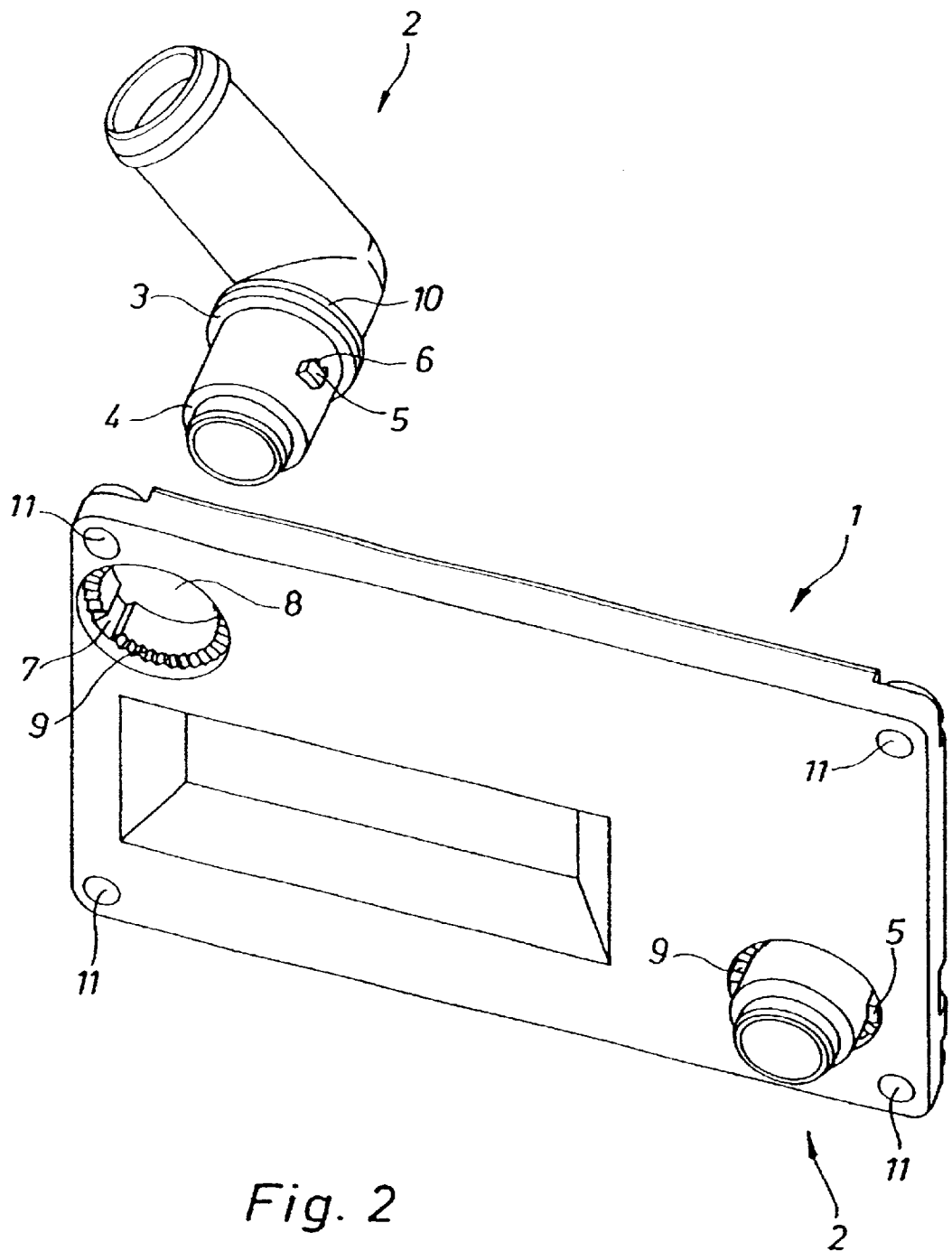
FIG. 2 is a perspective view of a housing cover with elbow branches viewed from the inside of the housing, where one elbow branch is already fastened and the other is shown before being axially introduced into an associated opening of the cover.

Each rotatable elbow branch 2 has a means securing against rotation, namely a securing mechanism with a lock (locking means) for securing the elbow branch in a selected rotated position on the housing cover 1. This can be seen especially in FIG. 2., An outer ring seal 3 in the direction of the outside of the cover and an inner ring seal 4 in the direction of the inside of the cover are also provided. The outer and inner ring seals are fixed by the housing cover 1 which can be fastened to the housing.

The outer and inner ring seals 3 and 4, respectively, are O-rings or flat packings, which permit an axial compression.

The securing device (securing against rotation) comprises two springs or projections 5 offset by 180° on the circumference of the leg of the elbow branch 2, which leg faces the housing cover 1 and is to be fastened to the housing cover 1. The projections 5 have a locking mechanism each facing away from the outside of the cover.

The housing cover 1 has, in turn, two cover openings 8 for the accurately fitting engagement of an above-mentioned leg of an elbow branch 2 for the feed and return of the water to the heater.

A ring locking mechanism 9 as well as axial grooves 7, whose shape is adapted to the projections 5 such that the above-mentioned leg can be axially introduced into or passed through the cover opening 8 up to an axial stop in the form of a circumferential flange 10 of the leg, with the outer ring seal 3 being interposed in this case, are located in the cover opening 8 on the underside. If the outer ring seal 3 is then compressed slightly more by axial pressure on the leg of the elbow branch, the leg or the entire elbow branch can be adjusted in terms of the angle of rotation as desired and can be secured against rotation by releasing the axial pressure on the leg by the pretensioning force of the compressed outer ring seal, and the upper locking mechanism 6 of each projection 5 will then engage the lower ring locking mechanism 9 of the cover opening.

The elbow branch 2, fastened to the housing cover 1 in a desired rotated position, comes into contact with an axial stop of the inner water tank water connection on the inside of the housing with the housing cover mounted on the housing. It is ensured as a result that the elbow branch can no longer be dislodged from its selected rotated locked position by compressing the outer ring seal and it can be dislodged only after removal of the cover.

Figure 3:
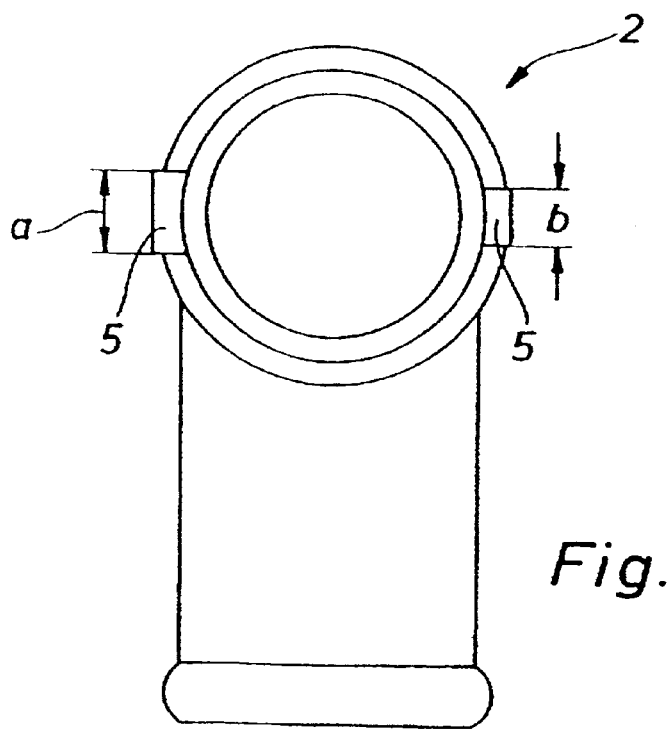
FIG. 3 is a front view of another embodiment of an elbow branch with two circumferential projections of different widths.
Figure 4:
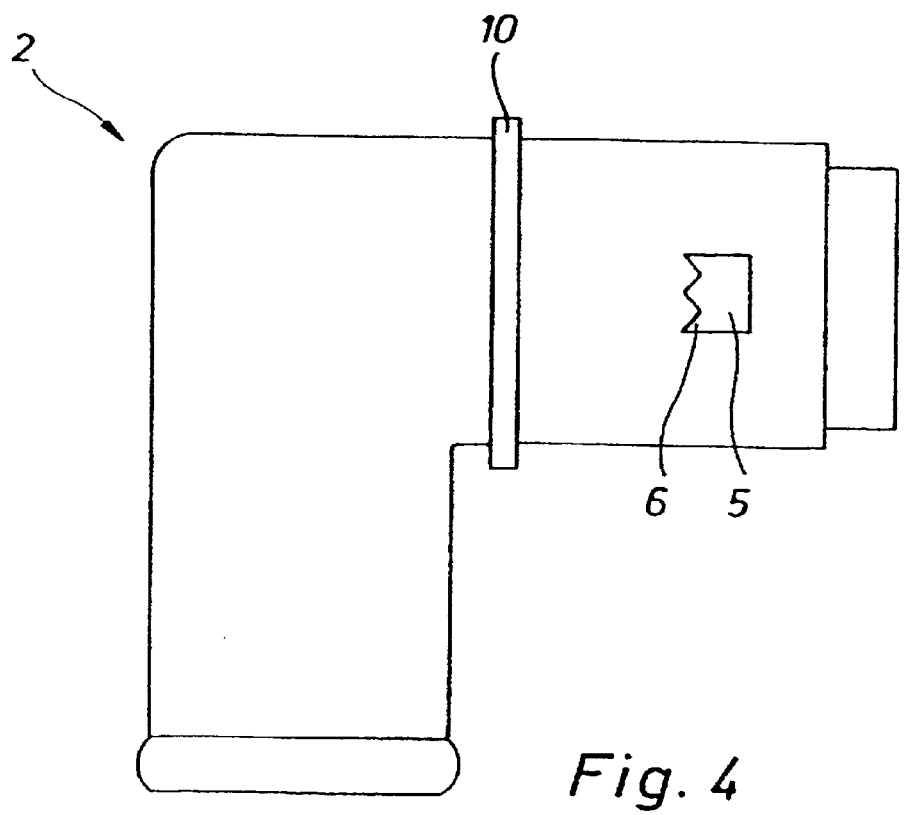
FIG. 4 is a side view of the embodiment of FIG. 3 of an elbow branch with two circumferential projections of different widths.
Figure 5:
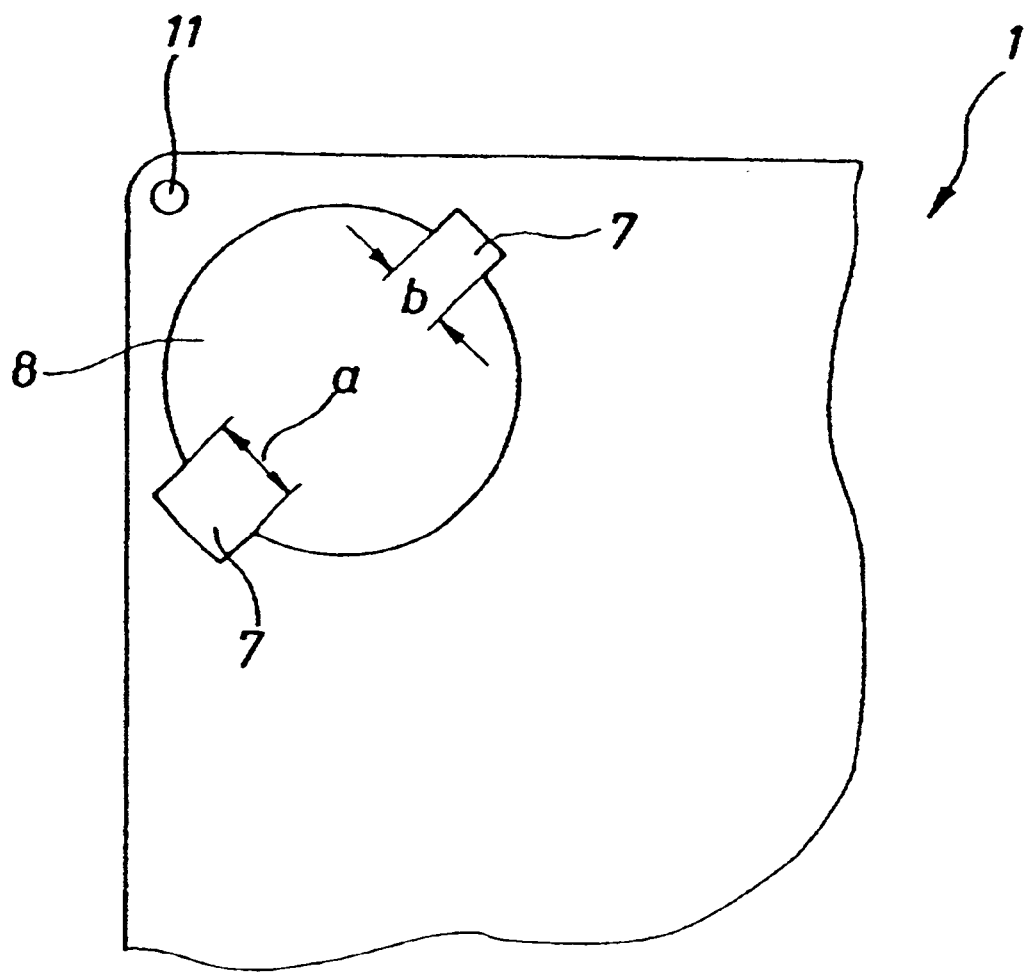
FIG. 5 is a schematic partial top view of a housing cover adapted in shape to the elbow branch according to FIGS. 3 and 4.

According to FIGS. 3, 4 and 5, the elbow branch has two projections 5 of different widths a and b and a housing cover 1 has two axial grooves 7 of correspondingly different width in one embodiment variant. As a result, the elbow branch can be axially introduced into the cover opening in a single rotated position only. The arrangement is such that the hole for the cover fastening 11 on the water jacket of the heater according to FIG. 5 is now covered by the free leg of the elbow branch 2. The mounting of the cover on the heater is possible only with the elbow branch rotated (out of the introduction position). The securing (fastening) of the elbow branch is thus guaranteed in all cases.

While specific embodiments of the invention have been shown and described in detail to illustrate the application of the principles of the invention, it will be understood that the invention may be embodied otherwise without departing from such principles.

What is claimed is:

1. A motor vehicle liquid fuel operated fluid heater cover assembly, comprising:

a cover with a first connecting branch opening and a second connecting branch opening with a peripheral outer connecting branch seat; and connecting branches for a fluid feed and fluid return, one of said connecting branches comprising a rotatable elbow branch mounted to said cover in said second connecting branch, said rotatable elbow branch having a reliant outer ring seal engaging said branch seat;

a securing device securing said rotatable elbow branch against rotation relative to said cover, said securing device including a lock mechanism connected to said cover and a lock portion connected to said rotatable elbow branch and engagable with said lock mechanism for securing the elbow branch in a selected rotational position relative to said housing cover from a multitude of rotational positions of said elbow branch relative to said housing cover and said elbow branch being rotatable relative to said cover while mounted to said cover upon moving said elbow branch axially in said second opening by compressing said reliant outer ring seal to disengage said lock portion from said lock mechanism to rotate said elbow branch to another selected rotational position relative to said housing cover from the multitude of rotational positions.

2. A motor vehicle liquid fuel operated water or air heater in the form of one of an auxiliary heater and a parking heater, the heater comprising:

housing with a burner and heat exchanger;

a cover; and connecting branches for the water feed or air feed and for the water return or air return one of said connecting branches comprising a rotatable elbow branch including a securing device securing against rotation with a lock mechanism for securing the elbow branch in a selected rotated position on the housing cover, wherein the securing device has at least one spring or a projection with an upper locking mechanism on the circumference of one leg of said elbow branch, which said leg can be fastened at right angles to the housing cover, and an axial groove with a shape adapted to and associated with said projection, in a cover opening associated with said elbow branch, wherein an underside of said cover opening has a ring locking mechanism, which can be caused to engage an upper locking mechanism of said projection.

3. A motor vehicle liquid fuel operated water or air heater in the form of one of an auxiliary heater and a parking heater, the heater comprising:

housing with a burner and heat exchanger;

a cover; and connecting branches for the water feed or air feed and for the water return or air return one of said connecting branches comprising a rotatable elbow branch with an outer ring seal in the direction of the outside of the cover and an inner ring seal in the direction of the heat exchanger, wherein the outer and inner ring seals are fixed by said housing cover and said housing cover is fastenable to said housing.

4. A motor vehicle liquid fuel operated water or air heater in the form of one of an auxiliary heater and a parking heater, the heater comprising:

housing with a burner and heat exchanger;

a cover; and connecting branches for the water feed or air feed and for the water return or air return one of said connecting branches comprising a rotatable elbow branch mounted to said cover for rotation of said rotatable elbow branch relative to said cover with simultaneous support of said rotatable elbow branch relative to said cover in any of a multitude of rotational positions of said elbow branch relative to said cover.

5. A heater in accordance with claim 4, wherein said rotatable elbow branch includes a securing device securing against rotation with a lock mechanism for securing the elbow branch in a selected rotated position on the housing cover.

6. A heater in accordance with claim 4, wherein said rotatable elbow branch has an outer ring seal in the direction of the outside of the cover and an inner ring seal in the direction of the heat exchanger, wherein the outer and inner ring seals are fixed by said housing cover and said housing cover is fastenable to said housing.

7. A heater in accordance with claim 5, wherein the securing device has at least one spring or a projection with an upper locking mechanism on the circumference of one leg of said elbow branch, which said leg can be fastened at right angles to the housing cover, and an axial groove with a shape adapted to and associated with said projection, in a cover opening associated with said elbow branch, wherein an underside of said cover opening has a ring locking mechanism, which can be caused to engage an upper locking mechanism of said projection.

8. A heater in accordance with claim 7, wherein said elbow branch has two projections preferably offset by 180° and the said housing cover correspondingly has two axial grooves preferably offset by 180°.

9. A heater in accordance with claims 7, said leg of said elbow branch can be fastened at right angles to said housing cover and has a said circumferential flange located at a spaced location from said projection to the outside and acts as an outer axial support of the said outer ring seal.

10. A heater in accordance with claim 9, wherein said outer ring seal is axially pretensioned by a spring on said housing cover in a rotated fastening position of said elbow branch and secures said projection in a ring locking mechanism.

11. A heater in accordance with claim 10, wherein said housing cover is mounted on said housing and said elbow branch is fastened to said housing cover and axially comes into contact with a heat exchanger water tank water connection, inside the housing.

12. A heater in accordance with claim 10 wherein said projections are of different width and two said axial grooves of correspondingly different width are provided.

* * * * *